United States Patent
Kao et al.

(10) Patent No.: US 9,964,772 B2
(45) Date of Patent: May 8, 2018

(54) THREE-DIMENSIONAL IMAGE DISPLAY APPARATUS, METHODS AND SYSTEMS

(71) Applicant: Wistron Corp., New Taipei (TW)

(72) Inventors: Meng-Chao Kao, New Taipei (TW); Jie-Ci Yang, New Taipei (TW); Hui Chen Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 284 days.

(21) Appl. No.: 14/841,253

(22) Filed: Aug. 31, 2015

(65) Prior Publication Data

US 2016/0373729 A1     Dec. 22, 2016

(30) Foreign Application Priority Data

Jun. 16, 2015  (TW) .............................. 104119366 A (51) Int. Cl.
| | |
|---|---|
| *G02B 27/24* | (2006.01) |
| *G02B 27/22* | (2018.01) |
| *H04N 13/04* | (2006.01) |

(52) U.S. Cl.
CPC ..... *G02B 27/2271* (2013.01); *H04N 13/0488* (2013.01)

(58) Field of Classification Search
CPC .. H04N 19/33; H04N 13/044; H04N 13/0402; H04N 13/0488; H04N 7/171; H04N 9/3147; G03B 37/04; G03B 21/28; G03B 21/10; G03B 21/58; G03B 21/64; G03B 35/20; G02B 27/22; G02B 27/106; G02B 27/1066; G02B 27/143; G02B 27/144; G02B 27/2235; G02B 27/2271; G02B 27/2292; G03H 1/22

USPC ....... 359/471, 462, 479, 403, 477, 23; 353/7
See application file for complete search history.

(56) References Cited

U.S. PATENT DOCUMENTS

| | | | | |
|---|---|---|---|---|
| 8,073,206 B2* | 12/2011 | Kamiyama | ............ | H04N 7/181 348/143 |
| 8,774,551 B2* | 7/2014 | Suzuki | ..................... | G06K 9/40 382/266 |
| 2011/0012830 A1* | 1/2011 | Yeh | ........................ | G06F 3/011 345/158 |

(Continued)

FOREIGN PATENT DOCUMENTS

| | | |
|---|---|---|
| CN | 101261367 A | 9/2008 |
| TW | M483620 U | 8/2014 |

(Continued)

OTHER PUBLICATIONS

Taiwan Patent Office, Office Action, Patent Application Serial No. 104119366, dated Aug. 15, 2016, Taiwan.

*Primary Examiner* — Bumsuk Won
*Assistant Examiner* — Collin X Beatty (57) ABSTRACT

The present disclosure provides a three-dimensional image display apparatus, which includes a first reflecting plate and a display unit. The first reflecting plate corresponds to a first visual angle, has a first reflecting surface, and is made of a translucent material. The display unit receives a first color-depth image corresponding to the first visual angle, and projects the first color-depth image to the first reflecting surface to form a virtual image. The display unit also has a first side, which is used to display the first color-depth image, and a predetermined angle is formed between the first side and the first reflecting surface.

5 Claims, 6 Drawing Sheets

(56) References Cited

U.S. PATENT DOCUMENTS

2015/0261004 A1* 9/2015 Chen .................. G02B 27/2271
          359/477
2015/0365645 A1* 12/2015 Bruls ................. H04N 13/0066
          348/43

FOREIGN PATENT DOCUMENTS

TW      201441756 A    11/2014
TW        I 481905     4/2015

* cited by examiner

THREE-DIMENSIONAL IMAGE DISPLAY
APPARATUS, METHODS AND SYSTEMS

CROSS REFERENCE TO RELATED
APPLICATIONS

This Application claims priority of Taiwan Patent Application No. 104119366, filed on Jun. 16, 2015, the entirety of which is incorporated by reference herein.

BACKGROUND

Field

The application relates in general to a three-dimensional image display apparatus, method, and system, and in particular to a three-dimensional image display apparatus, method, and system for forming a virtual image by projecting a plurality of color depth images to corresponding reflecting plates.

Description of the Related Art

For providing a better visual effect, image display technologies have advanced from providing a two-dimensional image to being able to provide a three-dimensional image with telepresence. When generating a three-dimensional image, the technology in common use segments the original image into two images—one for the left eye and one for the right eye—and then produces a virtual image by using specially treated glasses to receive the images, which are combined in the brain and interpreted as a 3D image. An alternative technology employs the Leia Display System (LDS), which forms a virtual image using a curtain of water. However, there are a lot of limitations with using the above methods. For one thing, each image must be segmented into two images for the left and right eyes. Also, the screen may be unstable, and use of the water curtain is limited by the surroundings. Thus, finding an easy way to display a virtual image at different visual angles is a problem which needs to be solved immediately.

BRIEF SUMMARY

An embodiment of the present disclosure provides a three-dimensional image display apparatus, including a first reflecting plate and a display unit. The first reflecting plate corresponds to a first visual angle, has a first reflecting surface, and is made of a translucent material. The display unit receives a first color-depth image corresponding to the first visual angle, and projects the first color-depth image to the first reflecting surface to form a virtual image. The display unit also has a first side, which is used to display the first color-depth image, and a predetermined angle is formed between the first side and the first reflecting surface.

Another embodiment of the present disclosure provides a three-dimensional image display method comprising: receiving a first color-depth image corresponding to a first visual angle by a display unit; projecting the first color-depth image to a first reflecting surface of a first reflecting plate from the display unit, wherein the display unit has a first side, which is used to display the first color-depth image; and forming a virtual image from the first color-depth image through the first reflecting surface. The first reflecting plate corresponds to a first visual angle, and is made of a translucent material, and a predetermined angle is formed between the first side of the display unit and the first reflecting surface.

Another embodiment of the present disclosure provides a three-dimensional image display system, comprising a plurality of depth image-capture devices, a plurality of color image-capture devices, a processing unit, a plurality of reflecting plates, and a display unit. The depth image-capture devices obtain a plurality of depth images in a plurality of respective visual angles. The color image-capture devices obtain a plurality of color images in the plurality of respective visual angles. The processing unit obtains a plurality of color-depth images in the visual angles according to the respective depth images and color images, and obtains a least one complementary color depth image according to two of the color-depth images. Each reflecting plate corresponds to a visual angle and has a reflecting plate, and is made of a translucent material. The display unit receives the color-depth images and the complementary color depth image, and projects the color-depth images and the complementary color depth image to the corresponding reflecting surfaces form a virtual image. The display unit further has a first side, which is used to display the color-depth images and the complementary color depth image, and a predetermined angle is formed between the first side and the first reflecting surfaces.

BRIEF DESCRIPTION OF DRAWINGS

The disclosure can be more fully understood by reading the subsequent detailed description and examples with references made to the accompanying drawings, wherein.

DETAILED DESCRIPTION

Further areas to which the present systems and methods can be applied will become apparent from the detailed description provided herein. It should be understood that the detailed description and specific examples, while indicating exemplary embodiments of the three-dimensional image display apparatus, method, and system, are intended for the purposes of illustration only and are not intended to limit the scope of the disclosure.

Figure 1:
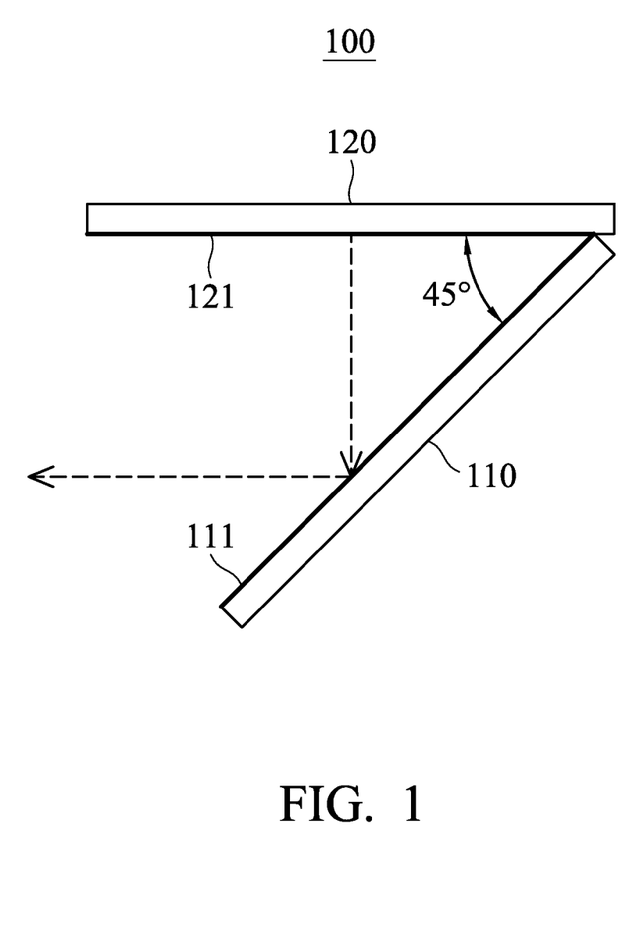
FIG. 1 is a side view of a three-dimensional image display apparatus in accordance with an embodiment of the disclosure.

FIG. 1 is a side view of a three-dimensional image display apparatus in accordance with an embodiment of the disclosure. As shown in FIG. 1, the three-dimensional image display apparatus 100 includes a reflecting plate 110, and a display unit 120. The reflecting plate 110 is made of a translucent material. The display unit 120 can be the display screen of the electronic device, or any device capable of displaying images, such as LCD, etc. The display unit 120 receives a plurality of color-depth images corresponding to different visual angles, and displays the color-depth images. The display unit 120 has a first side, which is used to display the images. The first side faces the reflecting plate 110, and an 45° angle is formed between the first side and the reflecting plate 110. The virtual image is formed on another side of the reflecting plate 110 which is opposite the reflecting surface 111 by the reflection of the reflecting surface 111, such as the dotted line shown in FIG. 1, when the user looks at the reflecting surface 111 which is used to reflect the images displayed by the display unit 120. In this embodiment, the 45° angle is formed between the sight and the reflecting surface 111.

Figure 2:
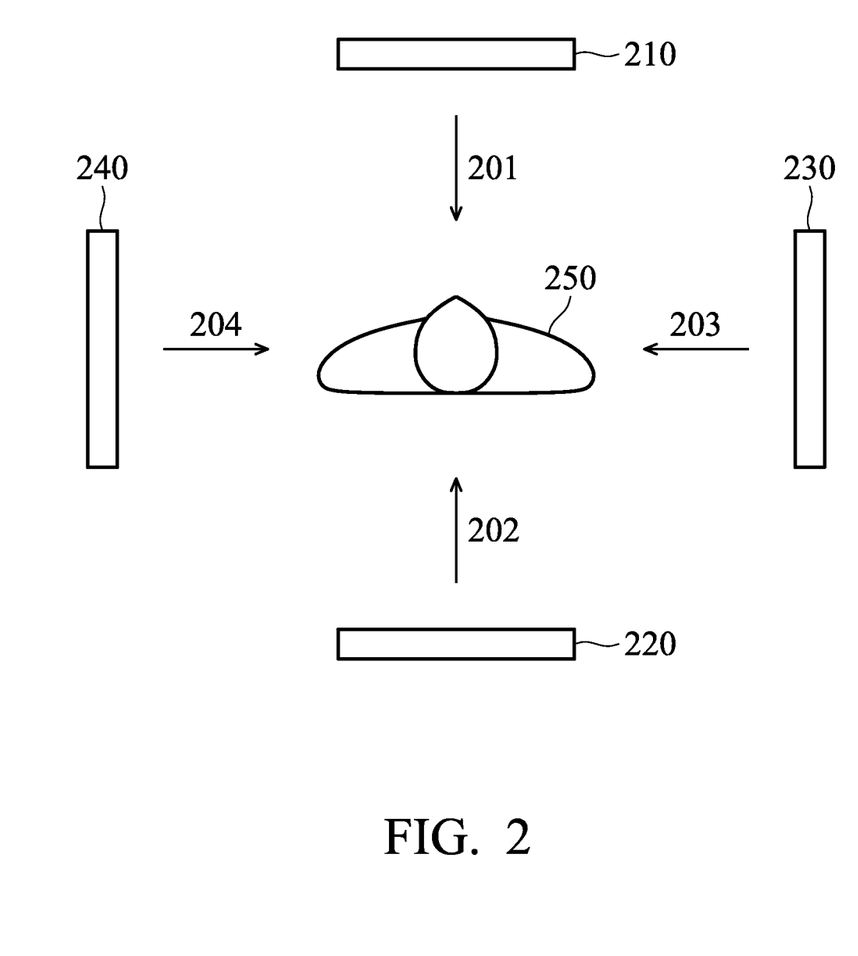
FIG. 2 is a schematic drawing of capturing the color-depth images in accordance with an embodiment of the disclosure.

According to an embodiment of the present disclosure, the color-depth images at different visual angles received by the display unit 120 are obtained by the image capture modules at different visual angles. FIG. 2 is a schematic drawing of capturing the color-depth images in accordance with an embodiment of the disclosure. As shown in FIG. 2, a user 250 stands in the central position of the image capture modules 210~240. In this embodiment, the image capture module 210 obtains the front image of the user 250 from the first direction 201 corresponding to a first visual angle. The image capture module 220 obtains the back image of the user 250 from the second direction 202 corresponding to the second visual angle. The image capture module 230 obtains the right-side image of the user 250 from the third direction 203 corresponding to the third visual angle. The image capture module 240 obtains the left-side image of the user 250 from the fourth direction 204 corresponding to the fourth visual angle. Each of the image capture modules also includes a depth image capture unit and a color image capture unit (not shown). Each depth image capture unit obtains the depth image with gray levels. For example, each depth image capture unit obtains the images of the user 250 with two cameras, and builds the depth image according to the disparity of the images. After obtaining the depth image, the processing unit (not shown) filters the background by implementing an image-processing program, and only keeps the portions of the image that are of the user. The color image capture unit, such as a normal camera, obtains the color image with the same visual angle with the depth image capture unit. After obtaining the color image, the processing unit filters the background by implementing the image-processing program, and keeps the portions of the image that are of the user. The processing unit builds the color-depth image of the user 250 by combining the color image of the user 250 and the depth image of the user 250.

Figure 3:
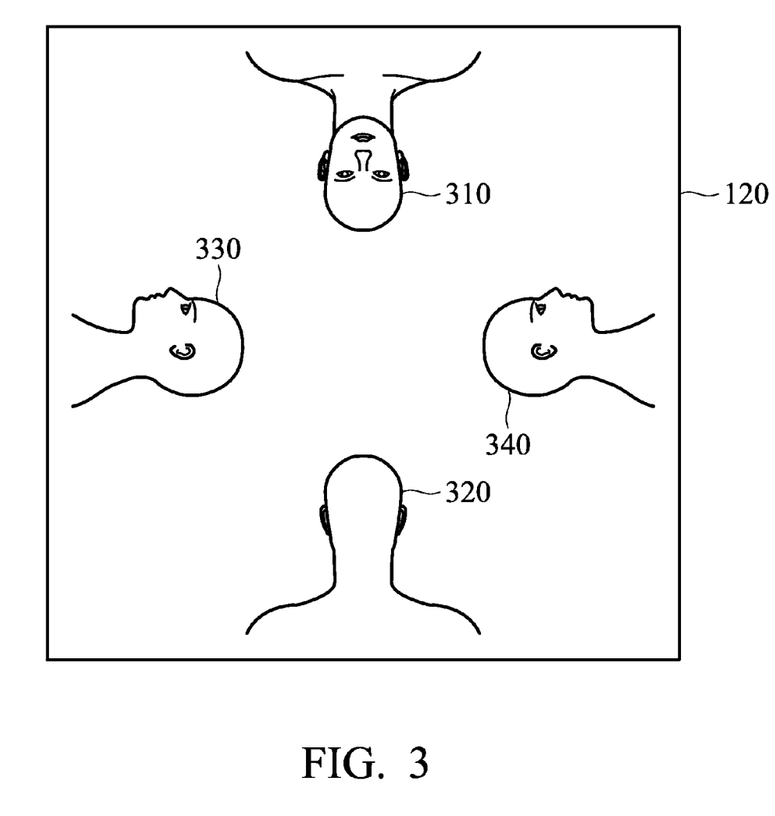
FIG. 3 is a schematic drawing of distributing the color-depth images in accordance with an embodiment of the disclosure.

After the image capture modules 210~240 obtain the color-depth images in different directions 201~204, the image capture modules 210~240 output the color-depth images to the display unit 120. The display unit 120 displays the color-depth images according to the distributions of the direction 201~204. FIG. 3 is a schematic drawing of distributing the color-depth images in accordance with an embodiment of the disclosure. The color-depth images 310~340 are captured by the image capture modules 210~240. In this embodiment, when the three-dimensional image display apparatus 100 reproduces the virtual image of the user 250, the distributions of the color-depth image 330 and the color-depth image 340 are opposite of the image capture module 230 and the image capture module 240 due to the display unit 120 displaying the color-depth images downwards. It should be noted that the distributions of the color-depth images displayed by the display unit 120 change with the relative positioning of the reflecting plate 110 and the display unit 120. For example, when the reflecting plate 110 is located above the display unit 120, the distributions of the color-depth image 330 and the color-depth image 340 are the same as the distributions of the image capture module 230 and the image capture module 240 to correctly reproduce the virtual image of the user 250.

Figure 4:
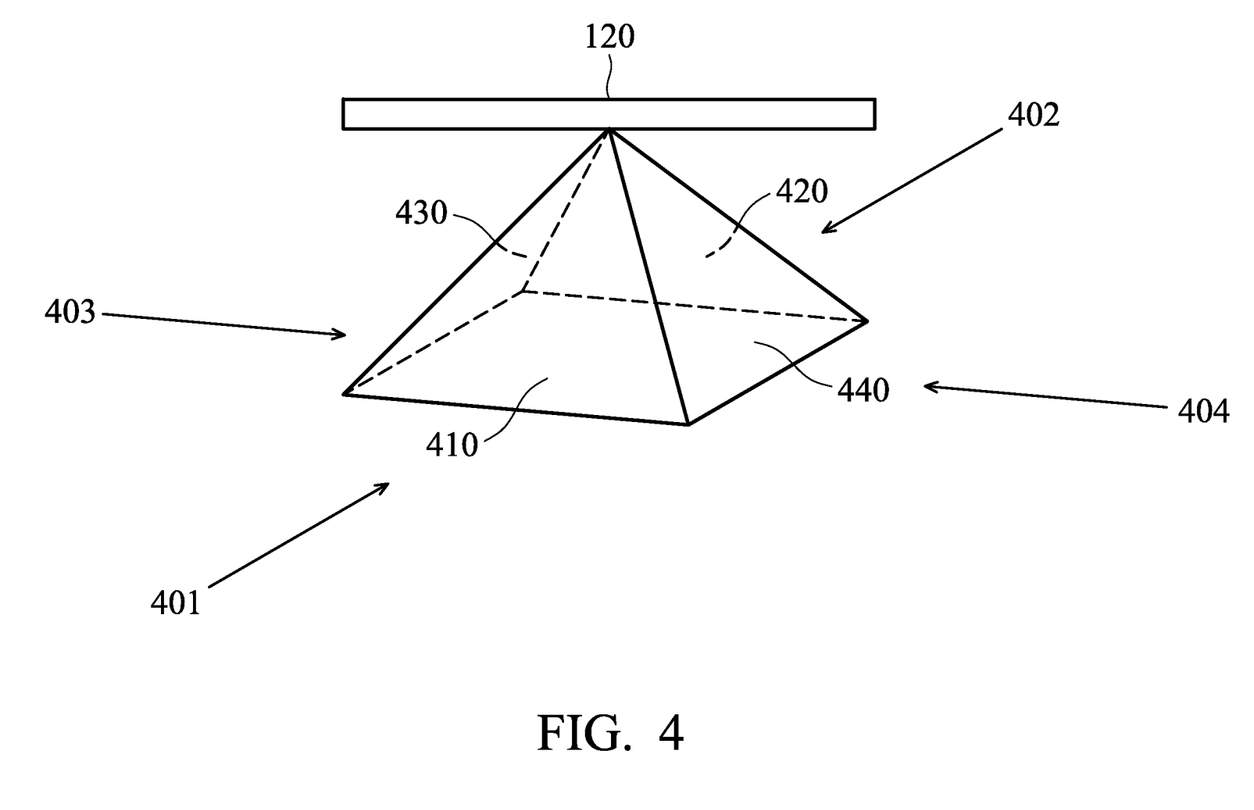
FIG. 4 is a schematic drawing of configuring the reflecting plates in accordance with an embodiment of the disclosure.

FIG. 4 is a schematic drawing of configuring the reflecting plates in accordance with an embodiment of the disclosure. As shown in FIG. 4, the reflecting plate 410 reflects the color-depth image 310 corresponding to the front image of the user 250. The reflecting plate 420 reflects the color-depth image 320 corresponding to the back image of the user 250. The reflecting plate 430 reflects the color-depth image 330 corresponding to the right-side image of the user 250. The reflecting plate 440 reflects the color-depth image 340 corresponding to the left-side image of the user 250. As shown in FIG. 4, the reflecting plates 410~440 form a quadrangle pyramid. The user sees the virtual image of the user 250 at different visual angles corresponding to different directions in the square pyramid by the reflections of the reflecting plates 410~440 when the user looks at the reflecting plates 410~440 at different visual angles 401~404.

Figure 5:
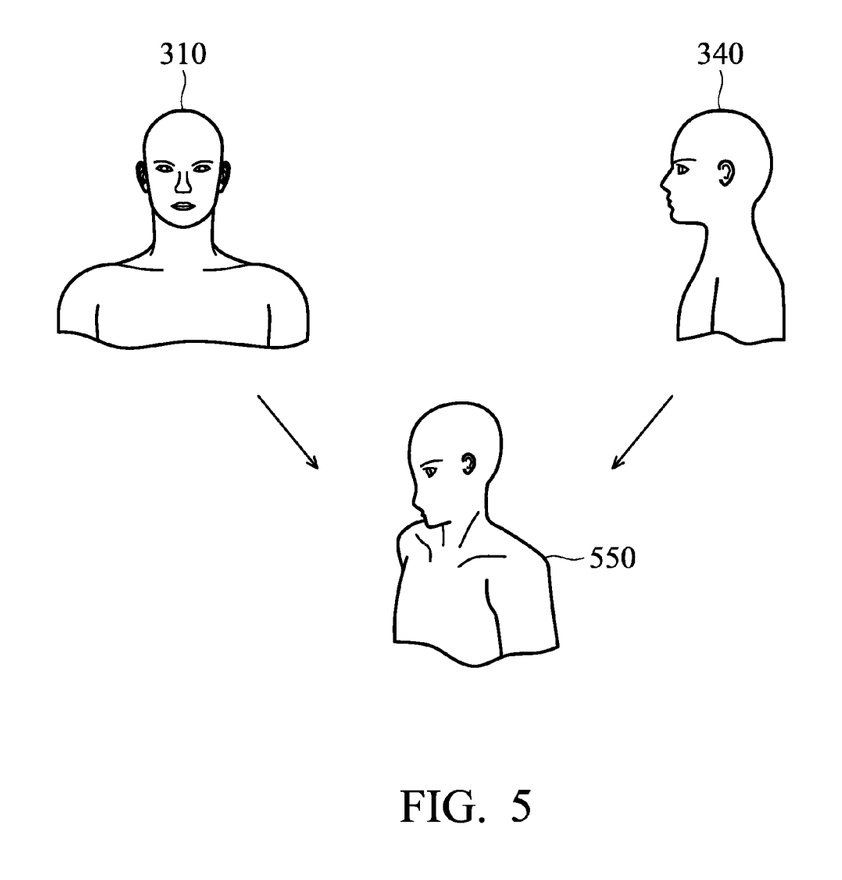
FIG. 5 is a schematic drawing of constructing the reflecting plates in accordance with an embodiment of the disclosure.

According to another embodiment of the present disclosure, when the display unit 120 displays more color-depth images, the processing unit obtains more color-depth images at other visual angles by calculating the color-depth images at a 0° angle, a 180° angle, a 90° angle, and a 270° angle captured by only four image capture modules. For example, when the display unit 120 displays the image at a 45° angle, the processing unit builds the complementary color-depth image 550 of the 45° angle shown in FIG. 5 by using the feature points of the face image, such as eyebrows, eyes, nose, or mouth, etc., obtained from the image information of the color-depth image 310 of the 0° angle and the color-depth image 340 of the 90° angle. Also, the reflecting plates are newly added according to the angles of the complementary color-depth images for displaying the virtual image of the user 250 at more visual angles. For example, when the display unit 120 displays the complementary color-depth images at a 45° angle, a 135° angle, a 225° angle, and a 315° angle, the virtual image shown at eight different angles is displayed by an octagonal pyramid formed of reflecting plates.

Figure 6:
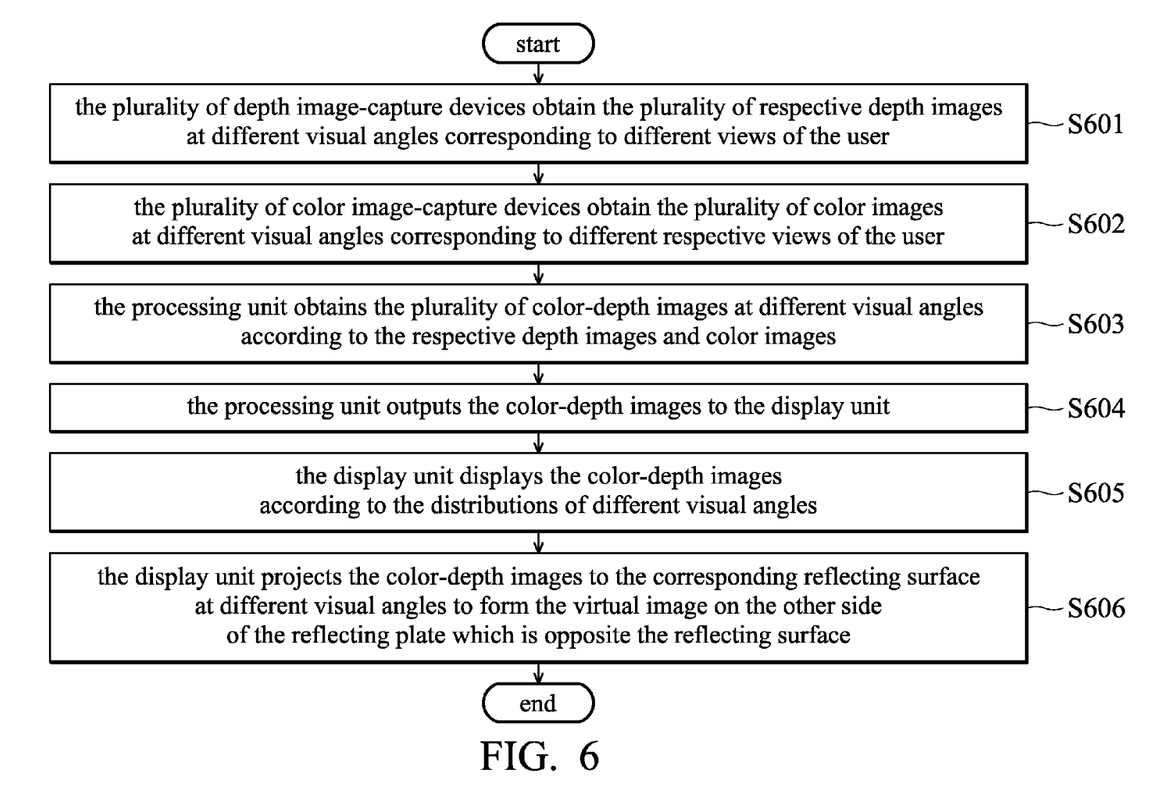
FIG. 6 is a flow chart of a three-dimensional image display method in accordance with an embodiment of the disclosure.

FIG. 6 is a flowchart of a three-dimensional image display method in accordance with an embodiment of the disclosure. In step S601, the plurality of depth image-capture devices obtain the plurality of respective depth images at different visual angles corresponding to different views of the user. In step S602, the plurality of color image-capture devices obtain the plurality of color images at different visual angles corresponding to different respective views of the user. In step S603, the processing unit obtains the plurality of color-depth images at different visual angles according to the respective depth images and color images. In step S604, the processing unit outputs the color-depth images to the display unit 120. In step S605, the display unit 120 displays the color-depth images according to the distributions of different visual angles. In step S606, the display unit 120 projects the color-depth images to the corresponding reflecting surface at different visual angles to form the virtual image on the other side of the reflecting plate which is opposite the reflecting surface.

It should be noted that, after obtaining the color-depth image at different visual angles, the processing unit builds the complementary color-depth images at different visual angles by using the feature points of the image information of two of the color-depth images. Also, the display unit projects the complementary color-depth images to the corresponding reflecting plates to form a more complete virtual image.

As described above, the disclosure provides a three-dimensional image display apparatus, method, and system. The user is able to build a complete virtual image by using four color-depth images captured by only four image-capture devices, and projecting the color-depth images to the corresponding reflecting plates through a display device. Furthermore, the complementary color-depth images are built by using the feature points of the face image from the image information of the color-depth images to form a more complete virtual image, and thus improve the visual effect of the virtual image.

It will be apparent to those skilled in the art that various modifications and variations can be made to the structure disclosed without departing from the scope or spirit of the disclosure. In view of the foregoing, it is intended that the present disclosure covers modifications and variations of this disclosure, provided they fall within the scope of the following claims and their equivalents.

What is claimed is:

1. A three-dimensional image display apparatus, comprising:
   a first reflecting plate, corresponding to a first visual angle, the first reflecting plate having a first reflecting surface, wherein the first reflecting plate is made of a translucent material, and a predetermined angle is formed between a first side and the first reflecting surface;
   a second reflecting plate, corresponding to a second visual angle, having a second reflecting surface, wherein the second reflecting plate is made of the translucent material, the predetermined angle is formed between the first side and the second reflecting surface, and the second visual angle is different from the first visual angle;
   a third reflecting plate, corresponding to a third visual angle, having a third reflecting surface, wherein the third reflecting plate is made of the translucent material, wherein the predetermined angle is formed between the first side and the third reflecting surface; and
   a display unit, receiving a first color-depth image corresponding to the first visual angle, a second color-depth image corresponding to the second visual angle and a complementary color-depth image corresponding to the third visual angle, and projecting the first color-depth image to the first reflecting surface, projecting the second color-depth image to the second reflecting surface and projecting the complementary color-depth image to the third reflecting surface to form a virtual image, wherein the display unit further has the first side, which is used to display the first color-depth image, the second color-depth image and the complementary color-depth image;
   wherein the second depth image is obtained by a second depth image-capture device in the second visual angle, and the second color image is obtained by a second color image-capture device in the second visual angle; and
   wherein the complementary color-depth image is obtained by matching facial features of a user image in the first color-depth image and the second color-depth image.

2. The three-dimensional image display apparatus as claimed in claim 1, wherein the first color-depth image is obtained by a first depth image and a first color image, the first depth image is obtained by a first depth image-capture device in the first visual angle, and the first color image is obtained by a first color image-capture device in the first visual angle.

3. A three-dimensional image display method, comprising:
   receiving a first color-depth image corresponding to a first visual angle by a display unit;
   obtaining a second color-depth image by a second depth image and a second color image, wherein the second depth image is obtained by a second depth image-capture device in the second visual angle, and the second color image is obtained by a second color image-capture device in the second visual angle;
   receiving the second color depth image corresponding to the second visual angle by the display unit;
   obtaining a complementary color-depth image by matching facial features of a user image in the first color-depth image and the second color-depth image;
   receiving the complementary color-depth image corresponding to a third visual angle by the display unit;
   projecting the first color-depth image to a first reflecting surface of a first reflecting plate from the display unit, wherein the display unit has a first side, which is used to display the first color-depth image;
   projecting the second color depth image to a second reflecting surface of a second reflecting plate;
   projecting the complementary color-depth image to a third reflecting surface of a third reflecting plate; and
   forming a virtual image based on the first color-depth image through the first reflecting surface, the second color-depth image through the second reflecting plate and the complementary color-depth image through the third reflecting plate;
   wherein the first reflecting plate corresponds to a first visual angle, and is made of a translucent material, and a predetermined angle is formed between the first side of the display unit and the first reflecting surface;
   wherein the second reflecting plate corresponds to the second visual angle that is different from the first visual angle, and is made of a translucent material, and the predetermined angle is formed between the first side of the display unit and the second reflecting surface; and
   wherein the third reflecting plate corresponds to the third visual angle, and is made of the translucent material, the predetermined angle is formed between the first side and the third reflecting surface.

4. The three-dimensional image display method as claimed in claim 3, further comprising:
   obtaining the first color-depth image by a first depth image and a first color image;
   wherein the first depth image is obtained by a first depth image-capture device in the first visual angle, and the first color image is obtained by a first color image-capture device in the first visual angle.

5. A three-dimensional image display system, comprising:
   a plurality of depth image-capture devices, obtaining a plurality of depth images in a plurality of visual angles, respectively;
   a plurality of color image-capture devices, obtaining a plurality of color images in the plurality of visual angles, respectively;
   a processing unit, obtaining a plurality of color-depth images in the visual angles according to the depth images and the color images respectively, and obtaining a least one complementary color depth image by matching facial features of a user image in two of the color-depth images;
   a plurality of reflecting plates, corresponding to the visual angles and a plurality of reflecting plates, respectively, wherein the reflecting plates are made of a translucent material; and a display unit, receiving the color-depth images and the complementary color depth image, and projecting the color-depth images and the complementary color depth image to the corresponding reflecting surfaces form a virtual image, wherein the display unit further has a first side, which is used to display the color-depth images and the complementary color depth image, and a predetermined angle is formed between the first side and the first reflecting surfaces.

* * * * *